Patented June 16, 1936

2,044,018

UNITED STATES PATENT OFFICE 2,044,018

SEPARATION OF LITHIUM SALTS

Walter Rosett, Oakcrest, Va., and Francis R. Bichowsky, Washington, D. C.

No Drawing. Application November 9, 1933, Serial No. 697,308

2 Claims. (Cl. 23—31)

(Granted under the act of March 3, 1883, as amended April 30, 1928; 370 O. G. 757)

The usual methods of separating lithium salts from mixtures containing them together with salts of other alkali and alkali earth metals involve converting such salts into sulphates, if not already in that form, then to dissolve the salts, if not already in solution, and precipitate the greater portion of the potassium as alunite or alum or both either by adding aluminum sulphate, if not already present, or by concentrating the solution to a point at which the alum or alunite will separate when aluminum sulphate is present in the solution. To precipitate the alunite it is necessary to control the alkalinity of the solution, which also effects a partial separation of the potassium. In separating the calcium and the remaining alkali earths and alkalis from the lithium sulphate, advantage is taken of the fact that the solubility of lithium carbonate lies between that of the alkali earth carbonates and the alkali carbonates. Therefore, by adding a controlled amount of a soluble carbonate, precipitates of the alkali earth carbonates can be brought down, leaving the lithium and alkali salts in solution. Further addition of soluble carbonates together with suitable concentration of the solution precipitates the greater part of the lithium carbonate and thus separates it essentially free from impurities. If the lithium is desired in some other salt it is necessary to treat the lithium carbonate with suitable reagents to produce that salt. This process has the disadvantage that it involves many steps, that it operates with large volumes of dilute solutions, that the salts must be in the form of sulphates and that large quantities of expensive precipitating agents must be employed. Lithium salts of a sufficient degree of purity for most commercial uses may be obtained much more readily and cheaply by our process hereinafter described.

In the practice of our invention a mixture containing lithium, the alkali earths and the alkalis—sodium, potassium, rubidium and caesium—is converted into chlorides by any suitable means, for example, by the addition of hydrochloric acid until the substances mentioned are converted to chlorides and a solution in which they are or may be included is substantially neutral, if the above specified elements are not already in the form of chlorides. If the above mentioned salts are not in solution, sufficient water is added to dissolve them completely or, at least, to the extent that all of the lithium chloride is dissolved. This aqueous solution, or mixture of solution and salt, containing substantially all the lithium chloride in the aqueous phase is then further concentrated by boiling either under reduced pressure or at atmospheric pressure to such a boiling point that when the solution is cooled it will precipitate the largest possible amount of the mixed alkali chlorides and will leave substantially all of the lithium chloride in solution.

For example, we may operate as follows: Starting with a solution containing lithium chloride, potassium chloride and sodium chloride in approximately equal amounts, we boil the solution under atmospheric pressure until it attains a temperature of about 108° C. On further boiling, the precipitation of the mixtures of potassium and sodium chlorides occurs. As the boiling is continued the temperature of the solution rises and additional potassium and sodium chlorides are precipitated. When the temperature of the boiling solution has reached 147° C. the heat is cut off, the solution allowed to cool and the mother liquor decanted or otherwise separated from the precipitate. This supernatant liquor is a commercially pure concentrated solution of lithium chloride containing not more than 4% of sodium and potassium chlorides as impurities. The precipitate is essentially a commercially valuable mixture of potassium and sodium chloride and is separated from the adhering mother liquor by washing with a small quantity of water, the liquid resulting from the washing being either thrown away or added to the solution at the beginning of the process. The concentrated and nearly saturated solution of lithium chloride is in a form that is commercially useful without further purification. However, if it is desired further to purify it, this may be done by concentrating the solution to such a point that, on cooling, the lithium chloride precipitates out in the form of monohydrate which will be contaminated with a very small percentage of alkali chlorides that are readily separated by fractional crystallization.

If the salts in solution at the beginning of the process include the alkali earth chlorides, especially those of magnesium and calcium, it is concentrated until the boiling point at atmospheric pressure reaches 165° C. During this concentration there will separate out first a mixture of potassium of sodium chlorides, then fractionally a mixture of potassium and sodium chloride and then a mixture of potassium and sodium chlorides together with calcium and magnesium chlorides. These last salts will only separate when the initial concentration ratio of alkali earths to the lithium chloride is about 1 to 1. Without substantially cooling the solution, it is separated hot by decantation or filtration from the precipitate and the solution allowed to cool which will cause the formation of a precipitate of lithium chloride monohydrate, calcium chloride in one of its hydrated forms, and traces of sodium and potassium chlorides. The remaining liquor which is then separated from the precipitate still contains certain quantities of calcium chlorides but is sufficiently pure for most commercial purposes without further treatment. The precipitate may be washed with a very small quantity of cold water to take the greater portion of the lithium chloride into solution while leaving the calcium chloride hydrate undissolved, the washings being added to the concentrated solution and put through the process again, or they may be used as impure lithium chloride solution directly. If it is desired to separate out additional calcium, it may be done by adding a sufficient quantity of soluble carbonate, preferably sodium carbonate, to the solution.

The invention described herein may be manufactured and used by or for the United States Government for governmental purposes, without the payment of any royalties thereon.

We claim:

1. A method of separating lithium from associated potassium and sodium, which comprises converting the said elements in the mixture to chlorides, boiling a solution of the said chlorides until the boiling temperature thereof is substantially 147° C. at atmosphere pressure, separating the supernatant liquid containing the lithium from the precipitate containing potassium and sodium.

2. A method of separating lithium from associated potassium, sodium, magnesium, and calcium, which comprises converting the said elements to chlorides, boiling a solution of the said chlorides until the boiling point at atmospheric pressure reaches substantially 165° C., separating the liquid from the precipitate without substantial cooling, then cooling the liquid and then separating the liquid containing the lithium from the precipitates formed during cooling.

WALTER ROSETT.
FRANCIS R. BICHOWSKY.